US010487810B2

(12) United States Patent
Wenger et al.

(10) Patent No.: US 10,487,810 B2
(45) Date of Patent: Nov. 26, 2019

(54) CAMSHAFT THRUST CONTROL SECURED BY DRIVE GEAR

(71) Applicant: CUMMINS INC., Columbus, IN (US)

(72) Inventors: Justin Gregory Wenger, Greenwood, IN (US); James Gregory Steinrock, Columbus, IN (US); Richard Duncan, Greenwood, IN (US); Aleksandr E. Lesin, Columbus, IN (US); Chin-Pei Wang, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 390 days.

(21) Appl. No.: 15/116,196

(22) PCT Filed: Feb. 3, 2014

(86) PCT No.: PCT/US2014/014429
§ 371 (c)(1),
(2) Date: Aug. 2, 2016

(87) PCT Pub. No.: WO2015/116230
PCT Pub. Date: Aug. 6, 2015

(65) Prior Publication Data
US 2017/0167473 A1 Jun. 15, 2017

(51) Int. Cl.
F03C 2/00 (2006.01)
F03C 4/00 (2006.01)
F04C 2/00 (2006.01)
F04B 1/04 (2006.01)
F04B 53/00 (2006.01)
F16H 53/04 (2006.01)

(52) U.S. Cl.
CPC .......... *F04B 1/0413* (2013.01); *F04B 53/006* (2013.01); *F16H 53/04* (2013.01)

(58) Field of Classification Search
CPC ....... F04B 1/0413; F04B 53/006; F16H 53/04
USPC .......... 418/131–132, 171, 181; 415/229, 231
See application file for complete search history.

(56) References Cited

U.S. PATENT DOCUMENTS

| 1,436,045 | A | 11/1922 | Meuer |
| 2,372,559 | A | 3/1945 | Edwards |
| 2,699,123 | A | 1/1955 | Bonnette et al. |

(Continued)

FOREIGN PATENT DOCUMENTS

| CN | 1839260 | 9/2006 |
| CN | 101529082 | 9/2009 |

(Continued)

OTHER PUBLICATIONS

International Search Report and Written Opinion dated May 22, 2014 in corresponding International Application No. PCT/US2014/014429.

*Primary Examiner* — Theresa Trieu
(74) *Attorney, Agent, or Firm* — Faegre Baker Daniels

(57) ABSTRACT

An apparatus and method of producing a pump including a housing and a cam received within the housing that is rotatable relative to the housing. The cam includes an axis of rotation. The pump further includes a retainer plate operable to abut the cam to restrict movement of the cam in a first direction along the axis of rotation. The pump further includes a biaser, such as a spring, operable to place a first constant force in the first direction on the retainer plate.

20 Claims, 3 Drawing Sheets

(56) References Cited

U.S. PATENT DOCUMENTS

| | | | |
|---|---|---|---|
| 3,021,791 A | * | 2/1962 | Rockwell ................ F04C 2/102 |
| | | | 418/131 |
| 3,303,790 A | | 2/1967 | McCray |
| 3,934,956 A | | 1/1976 | Pitner |
| 3,987,693 A | | 10/1976 | Swenson |
| 4,540,347 A | * | 9/1985 | Child .................. F04C 15/0061 |
| | | | 418/133 |
| 6,830,380 B2 | | 12/2004 | Kennedy, Jr. |
| 6,918,746 B2 | | 7/2005 | Duerr et al. |
| 7,284,537 B2 | | 10/2007 | Kleinbeck et al. |
| 8,491,289 B2 | * | 7/2013 | Showalter ........... F04C 15/0061 |
| | | | 418/133 |
| 2009/0155105 A1 | | 6/2009 | Mizuno et al. |

FOREIGN PATENT DOCUMENTS

| CN | 102272438 | 12/2011 |
|---|---|---|
| DE | 10 2011 081 862 | 2/2013 |

\* cited by examiner

CAMSHAFT THRUST CONTROL SECURED BY DRIVE GEAR

FIELD OF THE DISCLOSURE

The present disclosure is related to pump camshaft thrust surfaces. The present disclosure is more specifically directed to a pump camshaft thrust surface assembly that provides ease in assembly and that allow for variance in part sizing tolerances.

BACKGROUND

Pumps generally include a cam that rotates relative to a housing. This rotation is used to impart forces upon fluids to then direct the fluids as desired. To allow rotation of the cam relative to the housing, there is some degree of freedom therebetween. In the case of cams, this freedom also provides the potential for the cam to move axially relative to the housing. Axial movement of the cam has the potential to impair the functionality of the pump and to cause wear on abutting surfaces. Certain forces, thrust forces, are experienced by the cam that urge such axial movement. Accordingly, designs are provided that minimize, counteract, and/or contain such thrust forces.

Effective control of thrust forces often includes the management of such thrust forces in both directions along the axis of rotation. Also, precise forming and sizing of the various parts is typically required so as to allow a small amount of axial movement of the cam without impairing the ability of the cam to rotate about the axis of rotation freely. Such precise forming and sizing can be costly and/or time consuming.

Accordingly, there exists a need for an improved method and apparatus that provides adequate thrust control while allowing easy assembly and while allowing variance in at least some of the part sizes.

DETAILED DESCRIPTION

Briefly, in one example, a pump is provided including a housing and a cam received within the housing that is rotatable relative to the housing. The cam includes an axis of rotation. The pump further includes a retainer plate, the retainer plate is operable to abut the cam to restrict movement of the cam in a first direction along the axis of rotation. The pump further includes a biaser, such as a spring, operable to place a first constant force in the first direction on the retainer plate.

In another example, a pump is provided including a housing; a cam received within the housing and rotatable relative thereto, the cam including an axis of rotation; a gear coupled to a first end of the cam; a retainer plate, the retainer plate operable to abut the cam to restrict movement of the cam in a first direction along the axis of rotation; and a filler member located between the gear and the retainer plate, the filler member applying a force urging separation the gear and the retainer plate.

In yet another example, a method of assembling a pump is provided including: obtaining a pump housing; placing a cam within the housing; and coupling a gear to the cam, wherein coupling the gear to the cam urges abutment of a thrust surface to the cam.

Figure 1:
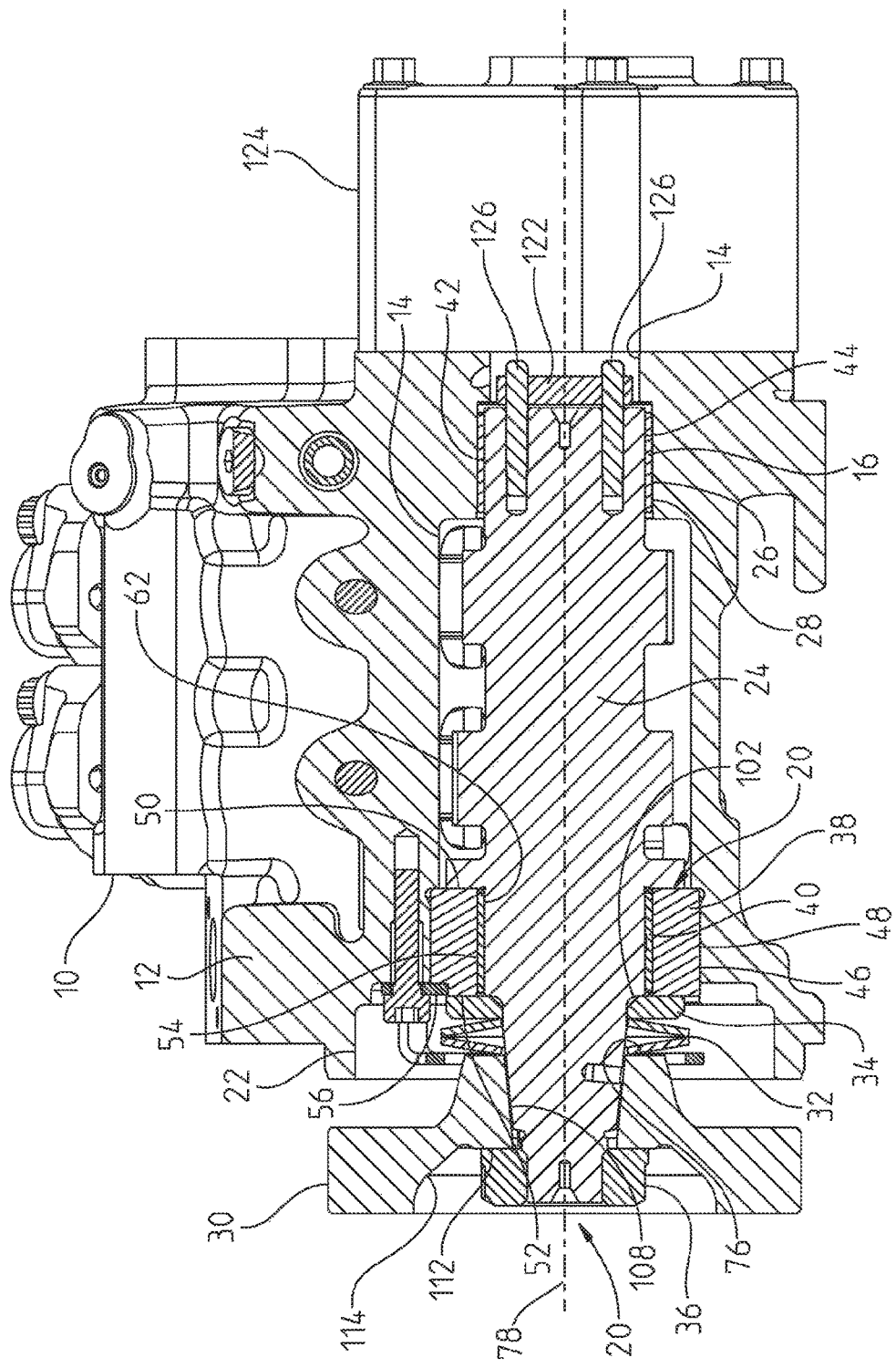
FIG. 1 is a cross-sectional view of a pump.

Turning now to the drawings wherein like numerals represent like components, FIG. 1 is a diagram of an exemplary fuel supply high pressure pump 10. While the present disclosure is made with reference to a specific pump, the teachings are illustrative only and are envisioned as having applicability to pumps in general. Pump 10 includes housing 12, bushings 16, 18 and cam assembly 20. Housing 12 is illustratively cast aluminum. Aluminum housing 12 is lightweight relative to steel housings and thus provides the opportunity for increased fuel efficiency.

Bushings 16, 18 include distal bushing 16 and proximal bushing assembly 18. As will be discussed in greater detail, housing 12 provides cam void 14 therein. Cam assembly 20 is at least partially received within cam void 14. Cam assembly 20 is introduced into cam void 14 via opening 22 that is on the left side of housing 12 as shown in FIG. 1. Accordingly, the terms distal and proximal as used in reference to bushing 16 and bushing assembly 18 are used to describe their position relative to opening 22 and their proximal/distal positioning as would be experienced by an individual approaching housing 12 from the side having opening 22 therein.

Distal bushing 16 is made of steel. Distal bushing 16 is cylindrical and has an outer diameter (OD) 26 sized to be press-fit into distal bushing bore section 28 of cam void 14. Distal bushing 16 is press-fit therein such that there is a high frictional engagement between distal bushing 16 and the walls of distal bushing bore section 28 of cam void 14. Accordingly, once seated, movement of distal bushing 16 relative to housing 12 is minimal and/or non-existent. Distal bushing 16 has an inner diameter (ID) 42 sized to receive distal bearing surface portion 44 of cam 24. ID 42 is further sized to allow a small gap relative to distal bearing surface portion 44 of cam 24 such that a lubricant can penetrate therebetween. The gap is customized to get a desired film thickness of the lubricant.

Proximal bushing assembly 18 includes sleeve 38 and proximal bushing 40. Sleeve 38 is illustratively constructed from steel. Sleeve 38 includes an outer surface 46 having an OD that is sized to frictionally engage sleeve portion 48 of cam void 14 while being removable therefrom. Sleeve 38 further includes annular distal thrust surface 50, annular proximal thrust surface 52, inner surface 54, and retainer portion 56.

Distal thrust surface 50 is sized, shaped, and located to provide a bearing surface that resists and counters proximally-directed thrust forces from cam 24. Proximal thrust surface 52 is sized, shaped, and located to provide a bearing surface that resists and counters distally-directed thrust forces from cam 24. Inner surface 54 is sized to receive proximal bushing 40 therein. Bushing 40 has an OD that approximates the ID of sleeve 38 such that a tight frictional engagement exists therebetween. Accordingly, once seated, movement of proximal bushing 40 relative to housing sleeve 38 is minimal and/or non-existent. Retainer portion 56 is actually a collection of a plurality of portions radially disposed around sleeve 38. In the present exemplary embodiment, there are two retainer portions 56, although only one is shown in FIG. 1. Retainer portion is sized and shaped to receive a portion of retainer 60 therein.

Proximal bushing 40 is similarly composed as distal bushing 16. While proximal bushing 40 is shown as being similarly sized as distal bushing, this need not be the case. Proximal bushing 40 includes an ID 62 that is sized to receive proximal bearing surface portion 64 of cam 24. ID 62 is further sized to allow a small gap relative to proximal bearing surface portion 64 of cam 24 such that a lubricant can penetrate therebetween. Again, the gap is customized to get a desired film thickness of the lubricant.

Retainer 60 illustratively includes a ring-like retaining member 72 that has attachment portions 66 that include voids sized, shaped, and located to receive bolts 68 therein. Retaining member 72 is sized to define a void therein that is larger than an OD of gap filler 32 and thrust washer 34. Retaining member 72 is sized to define a void therein that is smaller than the OD of gap filler 32 and thrust washer 34 while being larger than an OD of a distal surface 76 of drive gear 30.

Cam assembly 20 includes cam 24, drive gear 30, gap filler(s) 32, thrust washer 34, gear nut 36. Cam 24 is a multi-diametered member that is operable to rotate about a longitudinal axis of rotation 78. Cam 24 includes a number of differently-diametered portions including, distal bearing surface 44, pump surfaces 80, proximally directed thrust surface 82, proximal bearing surface portion 64, thrust washer engagement portion 84, gear engagement portion 86, and threaded portion 88. The sizing and operation of distal bearing surface 44 and proximal bearing surface portion 64 are discussed above. The sizing of pump surfaces 80 are provided so as to effect pressure gradients and pumping via the rotation of cam 20. Proximally directed thrust surface 82 is a surface that engages annular distal thrust surface 50 of sleeve 38 when proximally directed thrust is experienced by cam 24. Thrust washer engagement portion 84 includes a shoulder and provides axial and radial surfaces sized, shaped, and positioned to abut thrust washer 34. In operation, thrust washer 34 is forcefully pressed into engagement with thrust washer engagement portion 84 of cam 24 such movement therebetween is minimized or eliminated. Accordingly, rotation of cam 24 also causes rotation of thrust washer 34. Gear engagement portion 86 has a proximal taper such that the OD thereof decreases from thrust washer engagement portion 84 to threaded portion 88. The taper and sizing of gear engagement portion 86 provided to frictionally engage with drive gear 30. Threaded portion 88 is externally threaded. The threads are sized, shaped, and located to mate with internal threads of gear nut 36.

Figure 4:
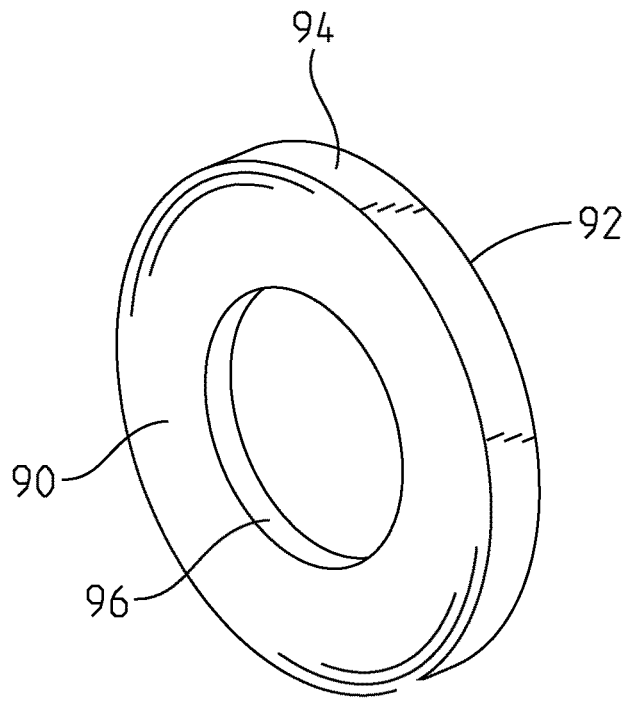
FIG. 4 is a perspective view of a thrust washer of the pump of FIG. 1.
Figure 3:
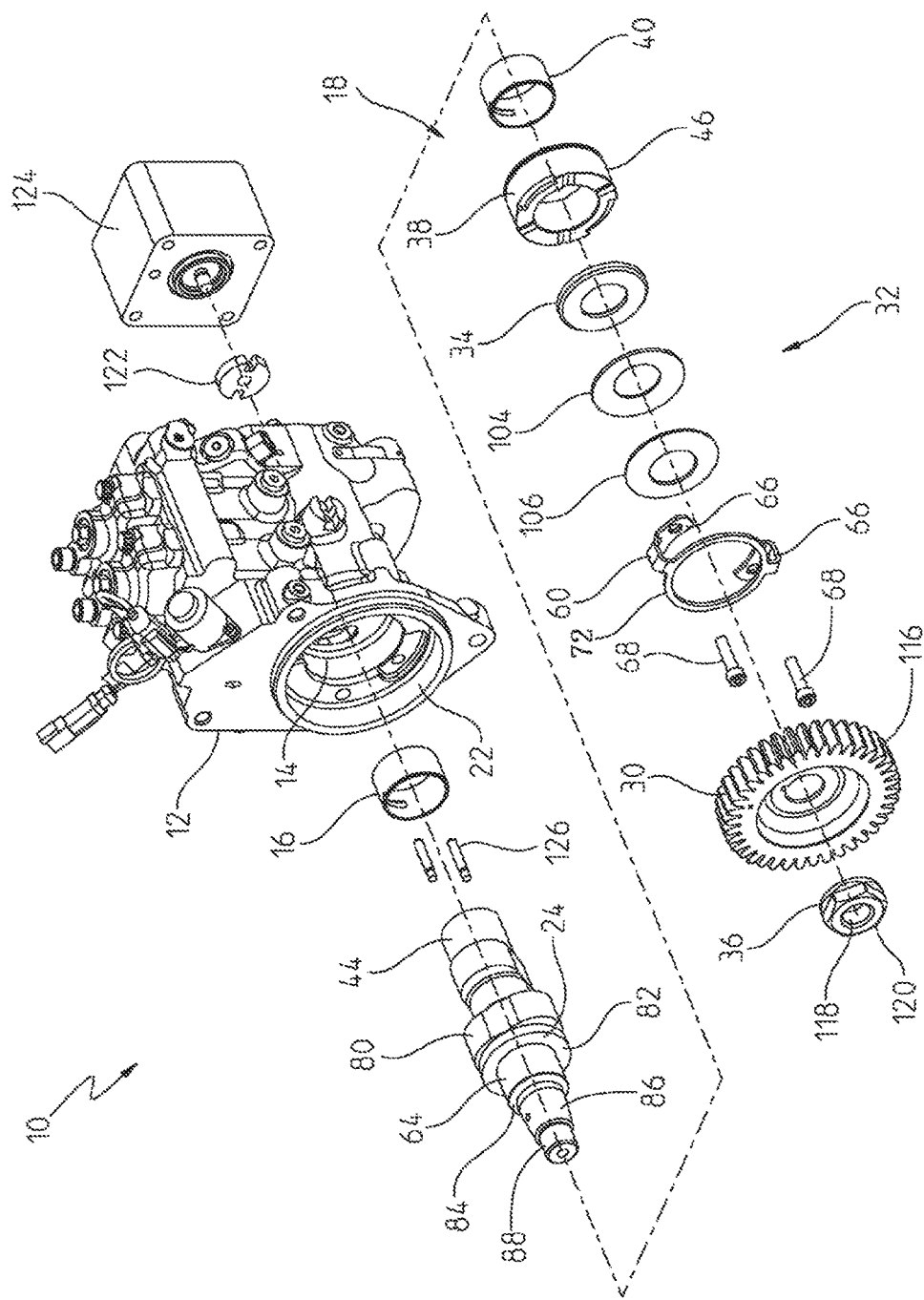
FIG. 3 is an exploded view of the pump of FIG. 1.

Thrust washer 34, FIG. 4, is a ring plate having proximal end 90, distal end 92, outer radial edge 94, and inner radial edge 96. Proximal end 90 provides a surface for abutment with gap filler 32. Distal end 92 provides distally-directed thrust surface such that distally-directed thrust experienced by cam 24 causes abutment of the distally-directed thrust surface to sleeve 38. Distal end 92, at a location radially inward from the distally-directed thrust surface provides a cam engagement surface. In the provided example, the cam engagement surface includes an angled or rounded portion 102, FIG. 1, that transitions from the cam engagement surface to inner radial edge 96 that also engages cam 24.

Gap filler 32 is illustratively two disc springs 104, 106 having an inner diameter substantially the same as that of thrust washer 34 and an outer diameter slightly larger than thrust washer. A Belleville washer is also known as a coned-disc spring, conical spring washer, disc spring, Belleville spring or cupped spring washer. Disc springs 104, 106 have a frusto-conical shape that gives the washers a spring characteristic. It should be appreciated that disc springs 104, 106 can have slightly changing inner and outer diameters as they experience differing levels of compression. In the present embodiment, the disc springs 104, 106 are identical and have high spring constants. However, it should be appreciated that the overall spring behavior can be customized as desired by providing washers having other spring constants and differing spring constants between the two disc springs 104, 106. Furthermore, while the use of two disc springs 104, 106 is discussed, use of a single Belleville washer or more than two disc springs is also envisioned.

Drive gear 30 is illustratively a toothed gear of the type driven by other toothed gears (not shown). Drive gear 30 includes cam engagement bore 108, distal surface 76, proximal nut surface 112, nut bore 114, and teeth 116. Cam engagement bore 108 is a tapering bore that is sized to fit on and frictionally engage gear engagement portion 86 of cam 24. Distal surface 76 is sized to fit within opening 22 and within the void of retaining member 72 of retainer 60. Distal surface 76 is further sized, shaped, and located to abut gap fillers 32. Proximal nut surface 112 is sized, shaped, and located to engage gear nut 36. Nut bore 114 is an opening in the proximal side of drive gear 30 that provides clearance for gear nut 36 therein. Teeth 116 are regularly spaced and sized to engage similar teeth on other gears that drive rotation of drive gear 30.

Gear nut 36 includes a threaded inner surface 118 and an outer surface 120. Threaded inner surface 118 is sized, shaped, and threaded to engage threaded portion 88 of cam 24. Outer surface 120 is sized and shaped to fit within nut bore 114 and to be graspable such that rotational force can be readily transmitted thereto without substantial slipping.

Figure 2:
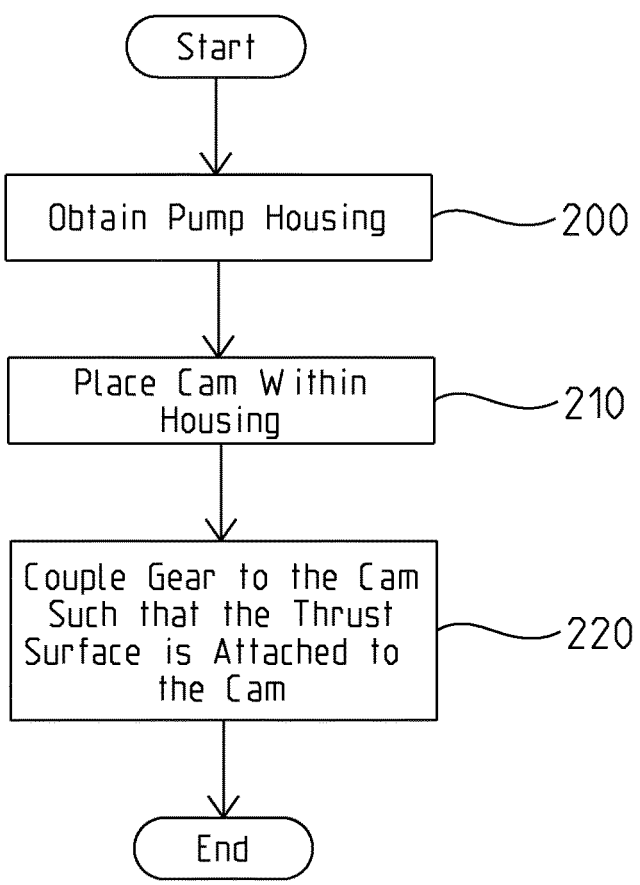
FIG. 2 is a flowchart showing an exemplary process for assembling the pump of FIG. 1.

In assembly, housing 12 is obtained having cam void 14 defined therein, block 200, FIG. 2. Distal bushing 16 is then placed within cam void 14 (via access through opening 22). Distal bushing 16 is seated (such as by press fitting) within distal bearing surface portion 44 of cam void 14. Cam 24 is then placed within cam void 14, again via access through opening 22, block 210. Sleeve 38, with proximal bushing 40 already seated therein, is then placed within cam void 14 to seat within sleeve portion 48 of cam void 14. It should be appreciated that such placement of sleeve 38 also results in proximal bushing 40 abutting proximal bearing surface portion 64 of cam 24. Thrust washer 34 is then seated on cam 24 and abutted to thrust washer engagement portion 84 such that cam 24 is received within an inner bore of thrust washer 34. Gap fillers 32 are then similarly seated on cam 24 such that cam 24 is received within an inner bore thereof. Retainer 60 is then located over gap fillers 32 and thrust washer 34 to partially seat within retainer portion 56 of sleeve 38. Bolts 68 are then passed through holes in retainer 60 and into threaded bores in housing 12 to secure retainer 60 to housing 12. Retainer 60 limits the proximal travel of gap fillers 32 and thrush washer 34. Drive gear 30 is then seated upon cam 24 such that the surface of cam engagement bore 108 frictionally engages gear engagement portion 86 of cam 24. It should be appreciated that gap fillers 32 may exert pressure on gear 30 such that gear 30 does not fully seat on gear engagement portion 86 until gear nut 36 is fully tightened, as described next. Gear nut 36 is then threaded onto cam 24. Once gear nut 36 is threaded to abut gear 30, further rotation of gear nut 36 presses cam engagement bore 108 against gear engagement portion 86 of cam 24 thereby increasing the friction therebetween. Such movement also applies a force to gap fillers 32. Such force at least partially compresses gap fillers 32. The force is then transmitted to thrust washer 34 to urge it into frictional engagement with cam 24. Accordingly, coupling gear 30 to cam 24 also causes thrust washer 34 (and distal end 92 having the thrust surface) to be attached to cam 24, block 220. Furthermore, compression of gap fillers 32 causes gap fillers 32 to press outwardly against both gear 30 and thrust washer 34 in a manner that attempts to separate gear 30 and thrust washer 34.

Pump 10 optionally includes coupling 122 and low pressure gear pump 124. Coupling 122 is press fit on a shaft of low pressure pump 124 and is driven by pins 126.

When so assembled, all of cam assembly 20 acts as a single piece and rotates as one within housing 12. Still further, abutting surfaces of cam assembly 20 and housing 12 are limited to portions of cam 24, proximal and distal bushings 16, 40, and in the case of thrust (axial movement), proximal and distal thrust surfaces 50, 52 of sleeve 38.

It should be appreciated that additional steps of assembly exist but are omitted from this description for simplicity. The present assembly provides for controlling thrust in both a proximal and distal direction while allowing assembly from a single side. Still further, the present disclosure provides sleeve 38 and cam 24 constructed from steel. Thus, these areas of engagement, that are likely to experience heat due to their relative movement are constructed from the same material and are thus likely to experience heat expansion similarly. Still further, the present embodiment provides this similarity in heat expansion without requiring that the entire housing 12 be constructed from the same material as cam 24.

Also, the sizes and locations of the thrust surfaces allow very small relative axial movement between cam 24 within housing 12. More specifically, thrust washer 34 is seated and held as distally as possible on cam 24 to minimize the distal movement of cam relative to sleeve 38 (and thus housing 12). Thus, if the combination of thrust washer 34 and gap filler 32 has an overall width (left-to-right width as shown in FIG. 1) that is smaller than needed then thrust washer 34 is not fully seated on cam 24 and increased left-to-right movement of cam assembly 20 is permitted. Conversely, if the combination of thrust washer 34 and gap filler 32 has an overall width that is too large, then drive gear 30 is prevented from properly seating on cam 24. Such lack of proper seating prevents a proper frictional engagement between cam 24 and drive gear 30. Accordingly, in cases drive gear 30 is able to "slip" relative to cam 24 such that cam assembly 20 does not always rotate as one.

Gap fillers 32 act as a high spring coefficient spring to, in assembly, keep constant pressure on thrust plate 34 to resist axial thrust forces without being so stiff as to prevent drive gear 30 from fully seating and fully engaging cam 24.

The above detailed description and the examples described therein have been presented for the purposes of illustration and description only and not for limitation. For example, the operations described may be done in any suitable manner. The method steps may be done in any suitable order still providing the described operation and results. It is therefore contemplated that the present embodiments cover any and all modifications, variations or equivalents that fall within the spirit and scope of the basic underlying principles disclosed above and claimed herein.

What is claimed is:

1. A pump including:
    a housing;
    a cam received within the housing and rotatable relative thereto, the cam including an axis of rotation;
    a retainer plate, the retainer plate operable to abut the cam to restrict movement of the cam in a first direction along the axis of rotation, the first direction being directed towards the retainer plate from the cam; and
    a biaser operable to place a first constant force on the retainer plate, the first constant force being in a second direction opposite to the first direction.

2. The pump of claim 1, wherein the biaser is a spring.

3. The pump of claim 2, wherein the biaser is a disc spring.

4. The pump of claim 1, wherein the first constant force urges the retainer plate into abutment with the cam.

5. The pump of claim 1, wherein the biaser has a variable length.

6. The pump of claim 1, wherein the retainer plate includes a void that receives a portion of the cam.

7. The pump of claim 1, wherein the biaser includes a void that receives a portion of the cam.

8. A pump including:
    a housing;
    a cam received within the housing and rotatable relative thereto, the cam including an axis of rotation;
    a gear coupled to a first end of the cam;
    a retainer plate, the retainer plate operable to abut the cam to restrict movement of the cam in a first direction along the axis of rotation, the first direction being directed towards the retainer plate; and
    a filler located between the gear and the retainer plate, the filler applying a force urging separation the gear and the retainer plate.

9. The pump of claim 8, wherein the filler is a spring.

10. The pump of claim 9, wherein the filler is a disc spring.

11. The pump of claim 8, wherein the retainer plate abuts the cam such that rotational force applied to the gear causes simultaneous and equal rotation of the retainer plate and the cam.

12. The pump of claim 8, wherein the force applied by the filler urges retainer plate into abutment with the cam.

13. The pump of claim 8, wherein the retainer plate includes a cam bore that receives a portion of the cam therein.

14. The pump of claim 13, wherein the retainer plate, when receiving the cam therein, is symmetrical about the axis of rotation of the cam.

15. A method of assembling a pump including:
    obtaining a pump housing;
    placing a cam within the housing; and
    coupling a gear to the cam, wherein coupling the gear to the cam urges abutment of a thrust surface of a sleeve to the cam.

16. The method of claim 15, wherein coupling the gear to the cam compresses a spring member positioned between the gear and the thrust surface.

17. The method of claim 15, further including attaching a biaser to the cam such that coupling the gear to the cam causes the biaser to exert a force urging abutment of the thrust surface to the cam.

18. The method of claim 15, wherein coupling the gear to the cam includes receiving a portion of the cam within a central void of the gear and threadably attaching a nut to the cam to secure the gear on the cam.

19. The method of claim 18, wherein threadably attaching the nut to the cam further causes compression of a biaser that, when compressed, urges the thrust surface into abutment with the cam.

20. A pump including:
    a housing;
    a cam received within the housing and rotatable relative thereto, the cam including an axis of rotation;
    a retainer plate, the retainer plate operable to abut the cam to restrict movement of the cam in a first direction along the axis of rotation, the first direction being directed towards the retainer plate;

a biaser operable to place a first constant force on the retainer plate, the first constant force being in a second direction opposite to the first direction; and a gear and a nut that couples the gear to the cam, the gear and nut positioned and configured such that attachment of the gear to the cam via the nut urges the biaser in the second direction.

\* \* \* \* \*